(No Model.) 2 Sheets—Sheet 1.
R. Z. CASSEL & G. M. FINCKEL.
CAR SIGNAL.
No. 586,418. Patented July 13, 1897.
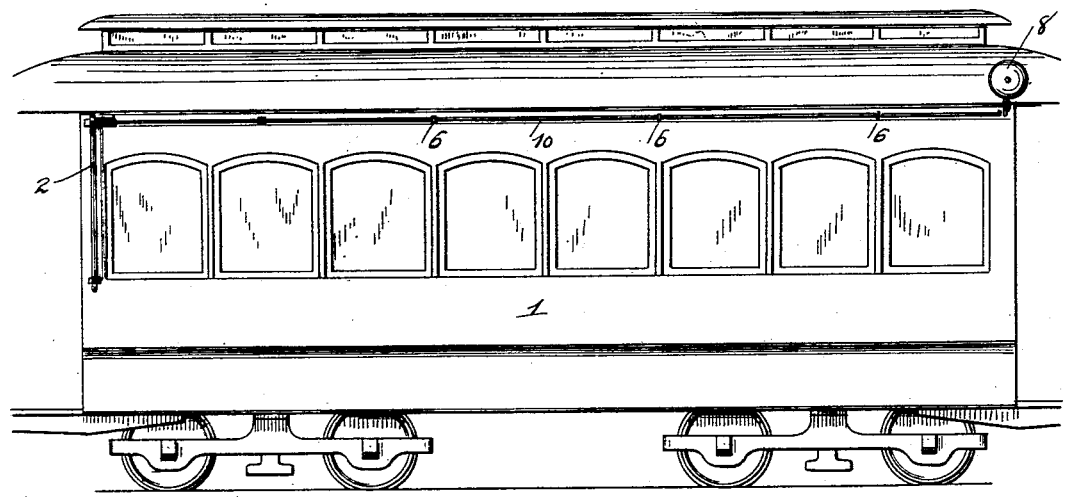
Fig. 1.
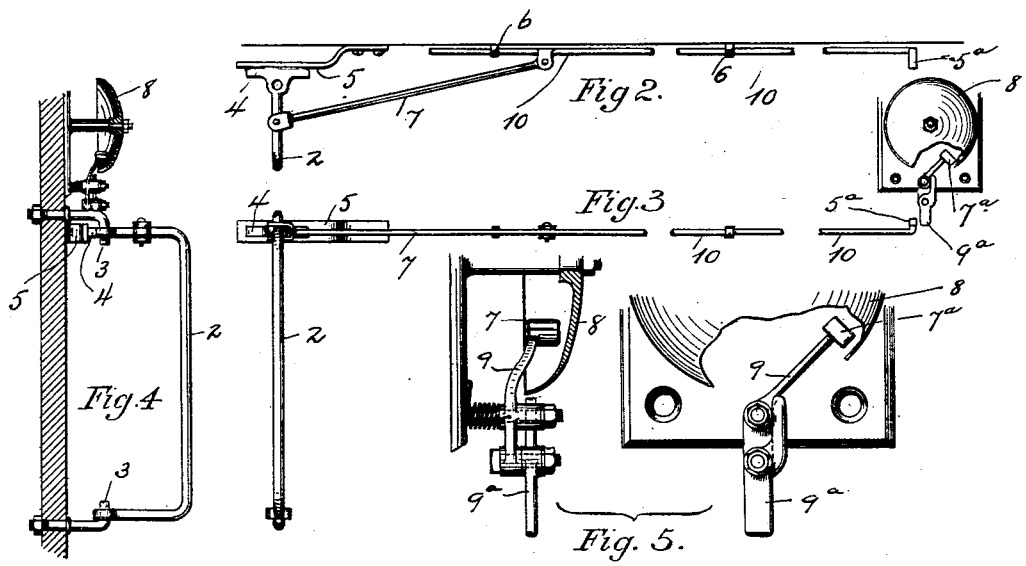
Witnesses  Inventors

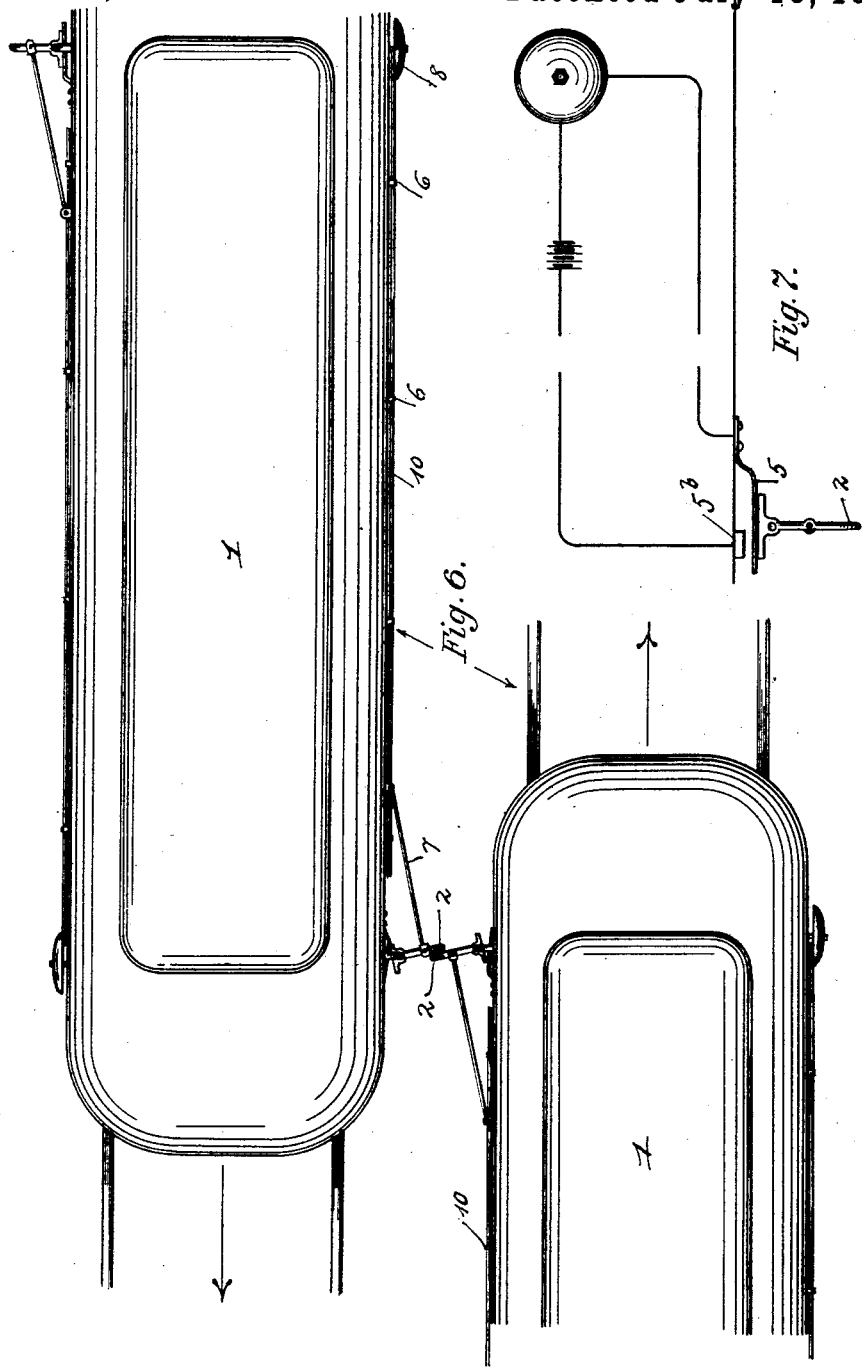

UNITED STATES PATENT OFFICE.

REUBEN Z. CASSEL AND GEORGE M. FINCKEL, OF COLUMBUS, OHIO.

CAR-SIGNAL.

SPECIFICATION forming part of Letters Patent No. 586,418, dated July 13, 1897.

Application filed April 3, 1897. Serial No. 630,596. (No model.)

*To all whom it may concern:*

Be it known that we, REUBEN Z. CASSEL and GEORGE M. FINCKEL, citizens of the United States, residing at Columbus, in the county of Franklin and State of Ohio, have invented certain new and useful Improvements in Car-Signals; and we do hereby declare the following to be a full, clear, and exact description of the invention, such as will enable others skilled in the art to which it appertains to make and use the same.

Unless exceeding care be exercised in leaving a car to cross an adjoining track or in crossing a street from behind a passing car on a near track pedestrians or passengers are liable to be struck by an approaching car on the adjoining or farther track.

It is the object of our invention to provide means for automatically sounding or exhibiting an alarm when cars are passing each other, so that accidents in such cases shall be to a large extent avoided.

Generally stated, our invention consists in the provision of a device on a car adapted to be operated by contact with a passing car or with devices on that car to effect an audible or visual signal, or both.

In the annexed drawings we have illustrated embodiments of our invention.

Figure 1 is a side elevation of a car provided with mechanism for effecting an audible signal. Fig. 2 is a top plan view on a larger scale, illustrating in detail the apparatus shown in Fig. 1, the rod on the side of the car being broken and the upper pivot of what we shall call the "striker-frame" and the gong or bell being omitted. Fig. 3 is a side view on a scale like that of Fig. 2, also showing the rod broken, but including the upper pivot of the striker-frame and the gong, the latter being broken to illustrate the bell hammer or clapper. Fig. 4 is an end view of the same apparatus on a scale like that of Fig. 2. Fig. 5 is a view on a still larger scale, illustrating in detail the gong or bell. Fig. 6 is a plan view of two railway-tracks upon which are pictured approaching cars equipped with apparatus embodying our invention. Fig. 7 is a plan view indicating means for effecting the signals electrically.

Like characters of reference in the several views of the drawings indicate corresponding parts.

1 designates the car, which may be of any construction. On one corner is an upright striker-frame 2, pivoted or hinged upon suitable pins 3 3, that are secured in the side of the car. In the construction illustrated the inner end of the upper arm of the frame is furnished with a cross head or bar 4, the face of which rests against the flat surface of a spring 5, that is fastened to the side of the car. The function of this spring is to hold the frame 2 normally but yieldingly at right angles to the side of the car. In other words, when the frame is swung out of this perpendicular position the pressure of the spring on one or the other of the extremities of the cross-head 4 tends to restore said frame to the perpendicular position.

Placed horizontally along the side of the car is a rod 10, that is held in such position by any suitable number of eyes or staples 6, but so as to be movable longitudinally therein. This rod 10 is shown to be connected with the upper arm of the striker-frame 2 by means of a link 7, that is hinged or knuckle-jointed to the rod and to the striker-frame. This construction permits the conversion of a curvilinear motion of the striker-frame 2 to a rectilinear motion of the rod 10. At the rear or opposite end of the rod 10 there is shown a lateral projection or finger $5^a$, that operates the hammer $7^a$ of a bell or gong 8, that is suitably mounted on the end of the car. The bell-hammer is shown to be on one arm of lever 9, having a hub that is journaled on a pin on the bell-support. A coil-spring connected to the support or pin and to the lever is adjusted to hold the hammer-head near the bell. The other arm of the lever is preferably pendent vertically and has pivoted to it a trip $9^a$, the oscillatory movement of which is limited in one direction, so that when the finger $5^a$ of the rod 5 is pushed rearwardly the hammer shall be operated or lifted, but in retraction said fingers shall pass by said trip without operating the hammer. In describing this particular form of alarm, however, we do not wish to be understood as confining ourselves thereto, as there are a large variety of ways in which an audible signal may be effected. In the place of, and indeed in addition to, the audible signal a visual signal may be operated by the movement of the rod 10.

In Fig. 7 we have illustrated an adaptation of the striker apparatus for effecting an alarm electrically. In this case suitable conductors in connection with an electric bell are connected, say, with the spring 5 and with a contact-piece $5^b$, so that when the spring is pressed inward against the contact-piece the circuit shall be closed and an alarm given. In such case the rod 10 and its attachments may be omitted.

To obviate the use of a battery upon each car where the system is electric, a portion of the propelling-current may be shunted upon the operation of the striker and so effect a signal.

In equipping cars with an alarm apparatus in accordance with our invention it will be desirable to place striker-frames at diagonally opposite corners, as indicated in Fig. 6. At the present time, especially in large cities where cars are propelled by electricity, the cars are seldom changed in their relative position on the track—in other words, the rear end of a car going in one direction becomes the front end on the return trip, so that by placing the striker apparatus at diagonally opposite corners of the car, as indicated in Fig. 7, they are in proper position whether the car be going in one direction or the other, it being understood, of course, that cars pass to the right of each other, according to the custom common in this country. The apparatus would be reversed in countries where the custom is the reverse; but should cars, through neglect or necessity, be made to pass each other in a manner the reverse of the custom no damage can occur, as the apparatus may be constructed as here shown to provide for such an exigency.

With our invention it is obvious that reliance upon the motorman or driver for giving an alarm under the circumstances here described is obviated. Much personal injury and loss of life are therefore avoided. In case of litigation the responsibility for accident is more easily located, and vexatious disputes as to contributory negligence are in a large measure overcome.

In thus setting forth a particular embodiment of our invention we do not wish it understood that we confine ourselves to the particular details of construction, arrangement, and location of parts shown or described, as they are obviously susceptible of change and modification without departing from the scope of our invention.

Due provision may of course be made for lengthening or widening the striker-frame, so as to adapt the apparatus to cars of different heights or to roads where the space between the tracks is different. The bell of course is not necessarily located on the same side of the car as the striker, but through obvious mechanism may be placed and operated on the opposite side of the car.

What we claim, and desire to secure by Letters Patent, is—

1. A street-car system having its cars provided with horizontally-movable wings or frames 2 of such height and width or lateral extension that the frames or wings of cars passing each other on adjoining tracks shall certainly strike each other, combined with an alarm mechanism on each car adapted to be operated upon the striking together of said wings or frames 2, substantially as described.

2. A street-car system having the corners of its cars provided with wings or frames 2 of considerable height adapted to move or swing horizontally and of such width that they shall strike each other when the cars pass each other, an alarm mechanism on the end of each of the cars opposite to that on which the wing or frame is placed, and means for operating said alarm when the frames 2 of passing cars come into contact with each other, substantially as described.

3. A street-car system having the corners of its cars provided with frames or wings 2 adapted to move or swing in a horizontal plane, said frames or wings being of such height and width that when the cars pass each other they shall be operated, a horizontally-movable rod 10 extending along the side of the car, a link 7 connecting said rod with the frame 2, and an alarm mechanism on the end of the car opposite to that on which the frame 2 is placed adapted to be operated by said rod.

4. A street-car system having the corners of its cars provided with frames or wings 2 adapted to move or swing in a horizontal plane, said frames or wings being of such height and width that when the cars pass each other they shall be operated, a movable rod 10, link 7 connecting said rod with the frame 2, an alarm mechanism adapted to be operated by rod 10, the cross-head 4 and spring 5 for returning frame 2 to the operative position, substantially as described.

In testimony whereof we hereto affix our signatures in the presence of two witnesses.

REUBEN Z. CASSEL.
GEORGE M. FINCKEL.

Witnesses:
EDWIN A. MCARTHUR,
J. HENRY VOSSKUEHLER.